United States Patent [19]

Beguin

[11] Patent Number: 5,692,589
[45] Date of Patent: Dec. 2, 1997

[54] MECHANISM FOR CONTROLLING A ROTARY MEMBER BY MEANS OF A PIVOTING HANDLE, AND SEAT EQUIPPED WITH SUCH A MECHANISM

[75] Inventor: Christophe Beguin, Flers, France

[73] Assignee: Bertrand Faure Equipement SA, Boulogne, France

[21] Appl. No.: 605,514

[22] Filed: Feb. 26, 1996

[30] Foreign Application Priority Data

Mar. 1, 1995 [FR] France ................................ 95 02364

[51] Int. Cl.$^6$ .............................. B60N 2/02; F16D 11/06
[52] U.S. Cl. ........................ 192/39; 297/361.1; 297/367
[58] Field of Search ...................... 192/39, 43.2, 54.1; 297/361.1, 362, 367

[56] References Cited

U.S. PATENT DOCUMENTS

| | | |
|---|---|---|
| 3,807,797 | 4/1974 | Klingelhofer . |
| 4,143,905 | 3/1979 | Hensel et al. ............... 297/361.1 X |
| 4,184,714 | 1/1980 | Courtois . |
| 4,269,447 | 5/1981 | Dottori . |
| 4,997,223 | 3/1991 | Croft . |
| 5,007,611 | 4/1991 | Kanai . |
| 5,109,963 | 5/1992 | Husted et al. . |
| 5,590,931 | 1/1997 | Fourrey et al. ............... 297/367 X |

FOREIGN PATENT DOCUMENTS

| | | |
|---|---|---|
| 0 505 229 | 9/1992 | European Pat. Off. . |
| 2117440 | 10/1983 | United Kingdom ............. 297/367 |

Primary Examiner—Charles A. Marmor
Assistant Examiner—Troy Grabow
Attorney, Agent, or Firm—Larson & Taylor

[57] ABSTRACT

In order to drive a shaft selectively in two opposite directions of rotation by means of a pivoting handle, use is made of a mechanism including an internally toothed ring which drives the shaft, a guide arranged diametrically inside the ring and mounted so that it can rotate, with friction, about the axis of pivoting of the handle, and a follower arranged with play inside the ring and driven by the handle with radial play and angular play. The follower exhibits two sets of toothing close to the ends of the guide for meshing with the internal toothing of the ring when the handle moves away from a neutral position, these sets of toothing being prevented from meshing with the internal toothing through interaction between reliefs of the follower and a slideway when the handle returns towards its neutral position.

9 Claims, 3 Drawing Sheets

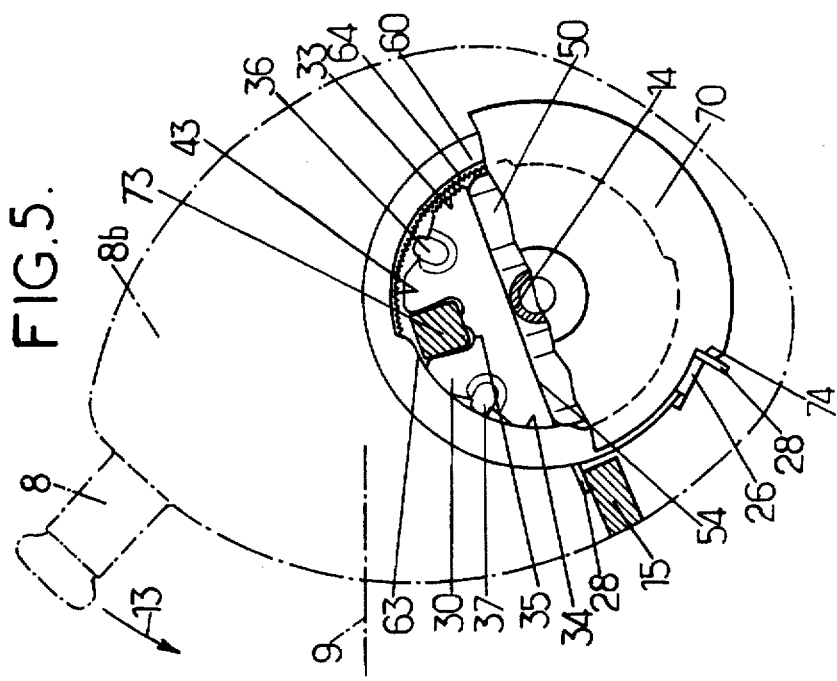
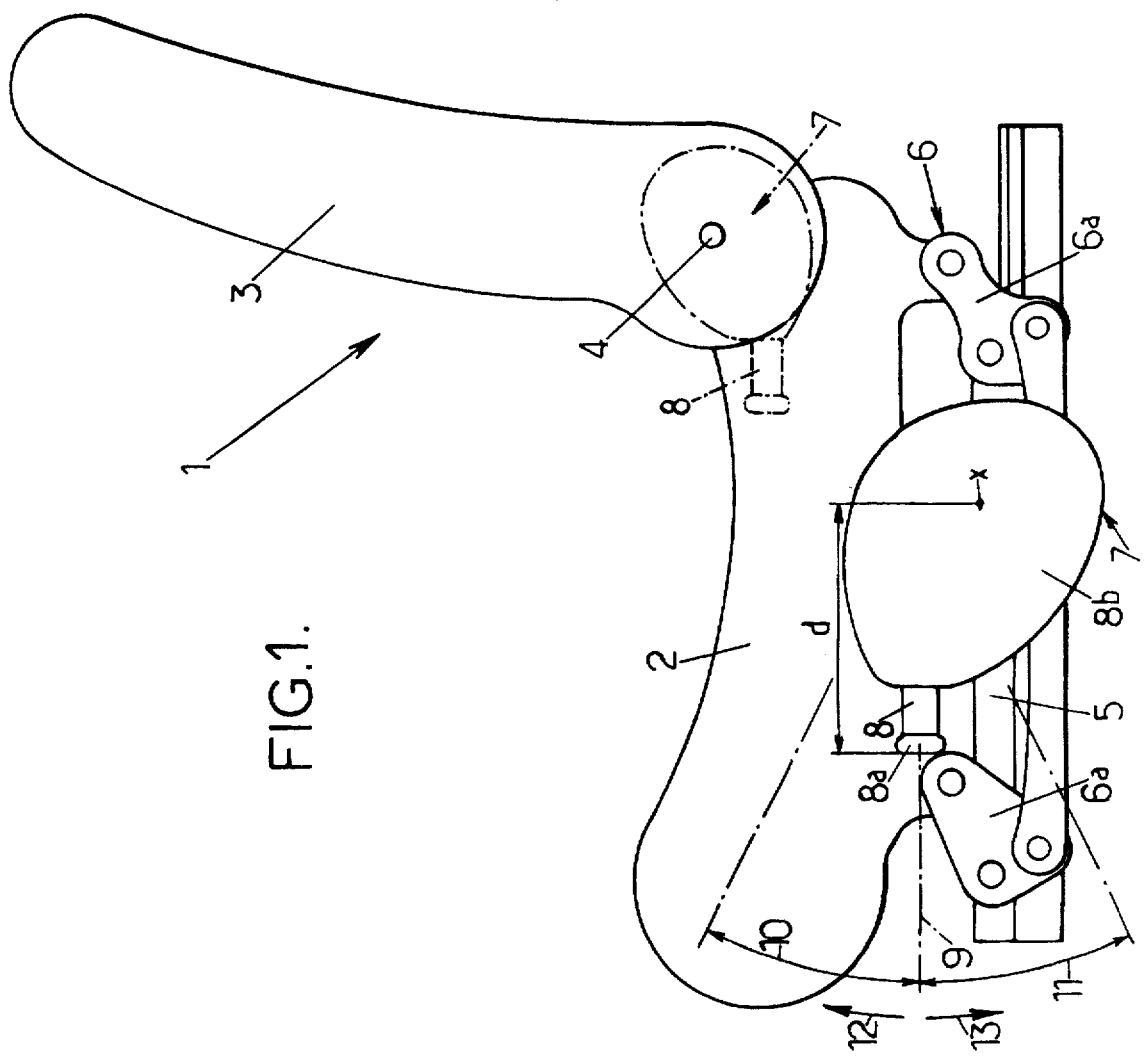

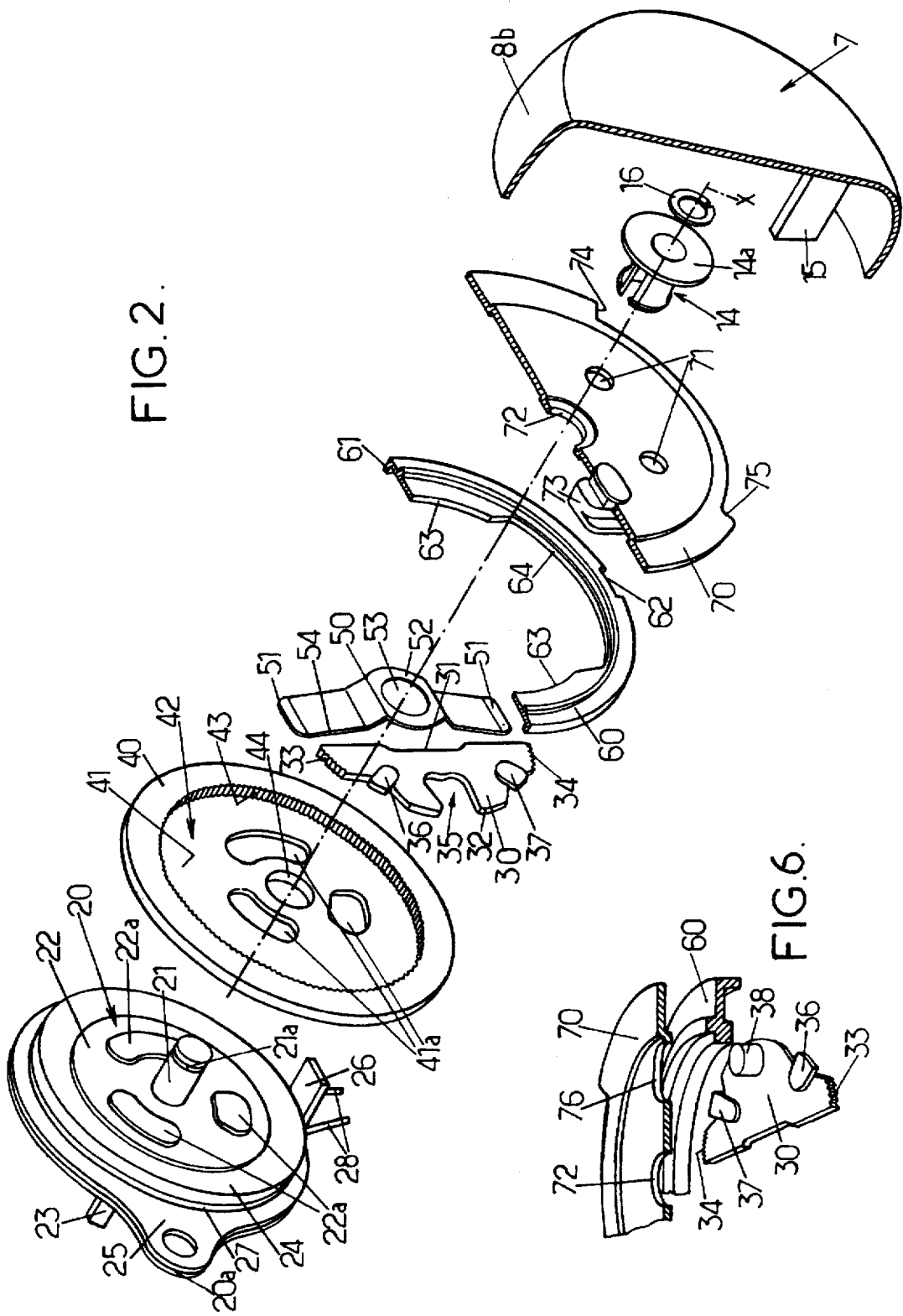

5,692,589

MECHANISM FOR CONTROLLING A ROTARY MEMBER BY MEANS OF A PIVOTING HANDLE, AND SEAT EQUIPPED WITH SUCH A MECHANISM

FIELD OF THE INVENTION

The invention relates to mechanisms for controlling rotary members using pivoting handles, and to seats equipped with such mechanisms.

More specifically, the invention relates to a mechanism for controlling a rotary output member for driving this output member selectively in opposite first or second directions of rotation, by means of a handle which is mounted about an axis of pivoting and which can be moved in a first direction of pivoting in a first angular sector starting from a neutral position and in a second direction of pivoting in a second angular sector starting from the neutral position.

BACKGROUND OF THE INVENTION

The document U.S. Pat. No. 5,007,611 describes one example of such a control mechanism, in which the output member is driven by a gearwheel which interacts selectively with one or other of two pawls mounted on the pivoting handle. Each of these two pawls allows the gearwheel to be driven in just one direction of rotation, and the choice of pawl with which the gearwheel interacts is controlled by a selector mechanism.

However, the device described in the aforementioned document exhibits the drawback of being relatively complicated, expensive and awkward to manipulate owing to the presence of the selector mechanism.

The particular aim of the present invention is to alleviate these drawbacks.

SUMMARY OF THE INVENTION

To this end, according to the invention, a mechanism of the sort in question is essentially characterized in that it includes:

a ring provided with internal toothing which is centered on the axis of pivoting of the handle and which is mounted so that it can rotate about this axis in order to drive the output member, this ring being integral with a wall, delimiting a dish therewith, a guide member placed in the dish mounted so that it can rotate, with friction, about the axis of pivoting of the handle, a toothed follower arranged with clearance inside the dish and mounted so that it can slide against the guide member in an orthoradial direction of sliding, the follower being driven by the handle and exhibiting first and second sets of toothing which are substantially symmetric with one another with respect to a radial axis perpendicular to the direction of sliding, the follower sliding against the guide member, causing the first set of toothing of the follower to mesh with the internal toothing of the ring when the handle is moved in the first direction of pivoting in the first angular sector, and the follower sliding against the guide member causing the second set of toothing of the follower to mesh with the internal toothing of the ring when the handle is moved in the second direction of pivoting in the second angular sector, the follower further including first and second reliefs which project away from the wall integral with the toothed ring, a rigid component forming a slideway which at least partially overlaps the ring and which is arranged on the opposite side to the wall integral with the ring, this rigid component exhibiting at least one guide ramp in the shape of a circular arc, this ramp being centered on the axis of pivoting of the handle, and framed by first and second cutouts, the first relief of the follower facing the first cutout while the second relief faces the guide ramp when the handle is in the first angular sector, the second relief therefore interacting with the guide ramp to prevent the second set of toothing of the follower from meshing with the internal toothing of the ring when the handle is moved in the second angular direction, and the second relief of the follower being arranged facing the second cutout while the first relief is arranged facing the guide ramp when the handle is in the second angular sector, the first relief of the follower then interacting with the guide ramp to prevent the first set of toothing of the follower from meshing with the internal toothing of the ring when the handle is moved in the first angular direction.

The control mechanism is particularly simple to operate, as all that it requires is simply for the handle to be pivoted to and fro in the first angular sector to move the output member in its first direction of rotation, and in the second angular sector to move the output member in its second direction of rotation.

Furthermore, the construction of the mechanism is simple and inexpensive, and its operation is reliable.

In particular, driving the ring by the meshing of one of the sets of toothing of the follower with the internal toothing of the ring allows torque to be transmitted very reliably to the ring.

Finally, the control mechanism operates silently, in contrast with the known pawl-type mechanism described hereinabove.

In preferred embodiments, recourse is further had to one and/or other of the following provisions:

the follower is driven by the handle by means of a link which has no orthoradial play with respect to the axis of pivoting but which has radial play with respect to this axis and play in terms of rotation about an axis parallel to the axis of pivoting of the handle;

the guide member consists of a leaf spring which bears elastically on the one hand against the wall integral with the toothed ring and, on the other hand, on a rigid element held a constant distance away from the wall in order thus to generate the friction which brakes the rotation of the leaf spring; the toothed ring is thus itself mounted so that it can rotate, with friction, about the axis of pivoting, the friction of the ring being greater than the friction of the leaf springs the component forming a slideway is a washer exhibiting an internal edge which has been cut out to form the guide ramp and the cutouts;

the link between the handle and the follower is achieved by means of a driving finger which runs parallel to the axis of pivoting and which connects the handle to the follower;

the driving finger connects the follower to a rigid plate which covers the component forming a slideway and which is fixed to the handle, this rigid plate being immobilized axially with respect to the toothed ring but able to move in terms of rotation;

the mechanism further includes elastic return means for urging the handle towards its neutral position;

the handle includes a non-telescopic lever which runs as far as a free end separated from the axis of pivoting of the handle by a lever arm less than about 20 centimeters long.

Another subject of the invention is a vehicle seat including an adjustment mechanism controlled by a control mechanism as defined hereinabove.

BRIEF DESCRIPTION OF THE DRAWINGS

Further features and advantages of the invention will become clear in the course of the following detailed description of several embodiments thereof, given by way of non-limiting examples, with reference to the attached drawings.

In the drawings:

FIG. 1 is a side view of a vehicle seat equipped with a control mechanism according to one embodiment of the invention;

FIG. 2 is a part-sectioned exploded view of the control mechanism of FIG. 1,

FIG. 5 is a view similar to FIG. 4, which shows the mechanism returning to the neutral position, and FIG. 6 is a part-sectioned exploded view of part of a control mechanism according to an alternative form of the invention.

DESCRIPTION OF THE PREFERRED EMBODIMENT

Figure 3:
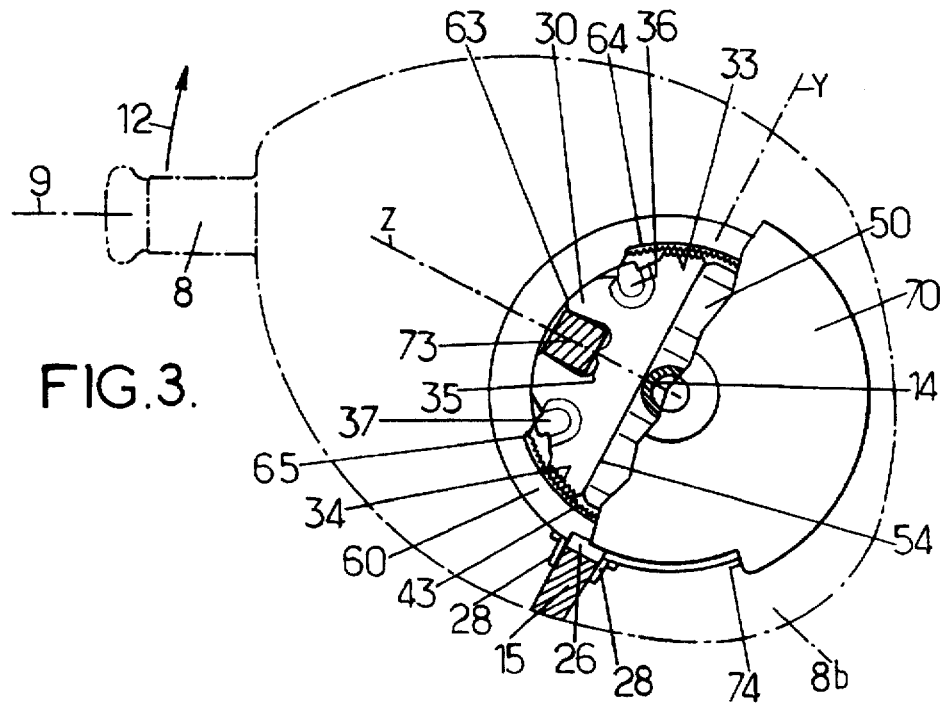
FIG. 3 is a part section of the control mechanism of FIG. 1, in the neutral position.

In the various figures the same references denote identical or similar elements.

The control mechanism according to the invention is more particularly intended to equip a motor vehicle seat 1 like the one represented in FIG. 1.

This seat includes a seat part 2 and a backrest 3 mounted so that it can pivot on the framework of the seat part about a spindle 4, this allowing the inclination of the backrest 3 to be adjusted.

The seat part 2 is mounted on a support, especially a slideway 5, by means of a raiser mechanism 6 which may in particular include link rods 6a.

This raiser mechanism is driven by a control mechanism 7 which is operated by means of a handle 8. The handle 8 pivots about a transverse axis X and it is in the form of a non-telescopic lever which runs perpendicular to the axis X as far as a free end 8a separated from the axis X by a lever arm with a distance d generally less than 20 centimeters, or even less than 15 centimeters long. The control mechanism 7 is therefore particularly compact.

The handle 8 may possibly be integral with a rigid cap 8b which covers the control mechanism.

To make the raiser mechanism 6 move, for example in the direction of raising the seat-part height, the handle 8 is pivoted about the axis X, moving the handle from its position of rest or neutral position 9 in a first angular sector 10 and the handle is then moved successively to and fro.

To move the raiser mechanism in the opposite direction, the handle 8 is moved in a second angular sector 11 symmetric with the first angular sector with respect to the neutral position 9, and again, the handle is moved successively to and fro.

During these to-and-fro movements, so long as the handle 8 is in the first angular sector 10, only those movements of the handle which take place in a first direction of rotation 12 lead to a movement of the raiser mechanism 6, whereas those movements of the handle 8 which take place in the opposite direction 13 do not give rise to any movement of the raiser mechanism.

By contrast, when the handle 8 is in the second angular sector 11, only those movements of the handle 8 which take place in the second angular direction 13 give rise to a movement of the raiser mechanism, the movements of the handle 8 in the opposite direction 12 not giving rise to any movement of the raiser mechanism.

Quite clearly, the control mechanism 7 is not limited to controlling a raiser mechanism, but may be used to control other adjustment devices of the seat 1.

In particular, as represented in dotted line in FIG. 1, another control mechanism 7 could be used to control the pivoting of the backrest 3 in order to adjust the inclination thereof.

As represented in FIG. 2, the control mechanism acts on a transmission device 20 known as an "irreversible" device which is driven by the to-and-fro pivoting of the handle 8 by means of a metal toothed ring 40 interacting with a metal toothed follower 30.

The transmission device 20 is externally in the form of a substantially circular housing, and it includes a rotary input member 22 as well as an output member 23, also rotary.

The input member 22 may consist of one face of the transmission device 20, which is fixed to a metal wall 41 itself integral with the ring 40. For that, in the example in question, the face of input member 22 has external bosses 22a which penetrate openings 41a in the wall 41. The input member could optionally consist of the wall 41 itself, this wall then forming one face of the transmission device 20.

The output member 23 may, for example, be a metal shaft of polygonal cross-section, or could equally well consist of one face of the transmission device 20.

Moreover, a shaft 21 of circular cross-section runs along the axis X starting from the face 22 of the transmission device. Close to its free end this shaft has a peripheral groove 21a, the usefulness of which will be seen later.

The transmission device 20 is said to be "irreversible" because it makes it possible to control the rotation of the output member 23 when a torque is applied to the input member 22, but does not transmit to the input member 22 the torques which are exerted on the output member 23.

Numerous examples of "irreversible" transmission devices are well known to those skilled in the art, so the device 20 will not be described in detail here.

The device 20 could optionally consist of a set of gears, especially when the control mechanism 7 is used to adjust the inclination of the backrest 3. One of many examples of such a set of gears is given in the document EP-A-0,505,229.

The transmission device 20 is fixed to a support belonging to the framework of the seat 1, for example by means of fixing lugs 20a.

In addition, in the example in question, the device 20 is partially contained in a metal flange 24, itself fixed to the framework of the seat by means of fixing lugs 25 which are located in register with the lugs 20a.

A rigid tab 26, the usefulness of which will be seen later, runs axially towards the ring 40 from the flange 24, this tab 26 being arranged on the outside of the ring 40.

Furthermore, a metal spring 27 substantially in the shape of an Ω is arranged around the flange 24. This spring 27 has two ends 28 which run substantially radially, framing the tab 26, and the ends 28 may be separated angularly from one another in an elastic fashion.

The ring 40, for its part, is arranged in a plane perpendicular to the axis X and centered on this axis, and in general it is formed as a single piece with the wall 41 with which it is integral.

The ring 40 and its wall 41 define a dish 42 which is open axially away from the transmission mechanism 20 and which is radially bounded by the internal toothing 43 of the ring 40.

Moreover, the wall 41 integral with the ring 40 is pierced with a central orifice 44 into which a bushing 14 is clipped, this bushing physically embodying the axis X of pivoting of the handle 8.

The dish 42 is partially covered by a rigid washer 60 which forms an outer rim 61 fitted around the ring 40, this rim 61 being provided with a cut out portion 62 which accommodates the tab 26, thus immobilizing the washer 60 in terms of rotation.

The washer 60 is itself covered by a rigid metal plate 70 which is secured to the handle 8, for example by means of one or more fixing holes 71 allowing screwing behind the cap 8b.

The plate 70 is furthermore pierced with a central orifice 72 which accommodates the bushing 14, allowing the plate 70 to pivot about the axis X, the pivoting of the plate 70 being limited by two limit stops 74, 75 which interact with the stationary tab 26.

The aforementioned shaft 21 passes through the bushing 14. The widened head 14a of this bushing, which overlaps the plate 70, is itself covered by an elastic ring 16 which clips into the peripheral groove 21a of the shaft 21 and which axially holds together the assembly consisting of the device 20, the ring 40, the washer 60 and the plate 70.

In this way, the plate 70 defines with the washer 60 the ring 40 and the wall 41, a closed housing which contains the follower 30 as well as a leaf spring 50 inside the dish 42.

The leaf spring 50 runs substantially diametrically with respect to the axis X, between two ends 51, and it has a central part 52 pierced with an orifice 53 through which the bushing 14 passes.

The two ends 51 of the leaf spring press elastically against the wall 41 integral with the ring 40, whereas the central part 52 of the leaf spring presses elastically against the rigid plate 70. In this way, the leaf spring is mounted so that it can rotate, with friction, about the axis X.

Moreover, at least one 54 of the longitudinal edges of the leaf spring is substantially straight and constitutes an orthoradial guide edge for the toothed follower 30.

For its part, the follower 30 is constructed in the form of a substantially planar cut out rigid metal plate which is held, with play, inside the dish 42 and which can move within the dish by sliding against the wall 41, against the washer 60, and against the guide edge 54 of the leaf spring.

The follower 30 includes, on the one hand, a rear edge 31 which is substantially straight and which slides against the guide edge 54 of the leaf spring in an orthoradial direction Y (FIG. 3) and, on the other hand, a front edge 32 substantially in the shape of a circular arc.

The front edge 32 at its two ends, that is to say close to the spring 50, has first and second sets of toothing 33, 34 directed radially outwards, and it is furthermore broken at its middle by a cutout 35.

The cutout 35 of the follower could possibly not emerge on the edge 32. This cutout takes a driving finger 73 which is integral with the rigid plate 70, the driving finger and the cutout being shaped so that the follower 30 cannot move orthoradially with respect to the finger 73 (i.e., in a direction which is perpendicular to the radial direction through finger 73) but can move radially slightly with respect to this finger in a direction Z (FIG. 3) or pivot slightly about the finger.

Thus, when a user actuates the handle 8, pivoting it about its axis X, this pivoting causes the follower 30 to slide orthoradially against the guide edge 54 of the leaf spring, meshing one of the two sets of toothing of the follower in the internal toothing 43 of the ring 40, then the pivoting causes the follower to turn about the axis X.

As an alternative, as represented in FIG. 6, the follower 30 could be integral with a drive finger 38 which is attached or formed as a single piece with the follower, this finger 38 penetrating a cutout 76 in the plate 70 substantially without orthoradial play, but with radial play and play in terms of rotation about the finger 38.

Moreover, the follower 30 has first and second reliefs 36, 37 arranged on the face thereof which faces away from the wall 41, these two reliefs preferably being close to the front edge 32 of the follower and respectively near the first and second sets of toothing 33, 34.

The two reliefs 36, 37 may optionally be obtained by stamping the metal plate forming the follower 30, or by any other means.

The reliefs 36, 37 interact radially with the internal edge of the washer 60, this edge having two identical and diametrically opposed circular slideways 63 which constitute guide ramps and which cooperate with the reliefs 36, 37 by simple radial abutment, the slideways 63 being separated by two cutouts 64, 65 (see FIG. 3) which have a larger
internal radius.

As an option, the internal edge of the washer 60 could have just the circular slideway 63 which is close to the follower 30, framed by two parts having an internal radius which is greater than the internal radius of the circular slideway 63.

The operation of the control mechanism will now be described with reference to FIGS. 3 to 5.

When the handle 8 of the control mechanism is in its neutral position 9, as represented in FIG. 3, the two sets of toothing 33 and 34 of the follower are disengaged from the internal toothing 43 of the ring, and the reliefs 36 and 37 of the follower are arranged immediately on either side of one of the circular slideways 63, or of the slideway 63 if there is only one.

Starting from the neutral position, if the handle 8 is moved in the first angular sector 10 in the first direction of rotation 12, for example with a view to raising the seat, the driving finger 73 tends to move the follower 30 in rotation about the axis X, but the rear edge 31 of the follower interferes with the guide edge 54 of the leaf spring 50, mounted so that it can pivot about the axis X with friction.

At the beginning of the movement of the handle 8, by virtue of the braking achieved by friction of the leaf spring 50, the rear edge 31 of the follower therefore slides against the guiding edge 54 of the leaf spring, until the first set of toothing 33 of the follower comes into mesh with the internal toothing 43 of the ring.

This movement of the follower is not impeded by its first relief 36, as the latter is then facing the first cutout 64 of the washer 60.

During the orthoradial sliding of the follower, the handle 8 moves angularly over an angle which may, for example, be less than 6 degrees.

During this movement, by virtue of the play between the driving finger 73 and the cutout 35 of the follower, the follower moves radially very slightly with respect to the finger 73 and it also pivots slightly about the finger 73.

After the first set of toothing 33 of the follower has meshed in the internal toothing 43 of the ring, the follower is driven in pivoting about the axis X by the driving finger 73, and the follower in turn drives the ring 40 which itself drives the output shaft 23 via the transmission mechanism 20 in order to raise the seat.

During this movement, the two ends 28 of the spring 27 are elastically separated from one another, one of the two ends 28 pressing against the stationary tab 26 and the other end 28 pressing against a rigid tab 15 which projects axially towards the transmission mechanism 20, starting from the inside of the cap 8b, and which is arranged between the two ends 28 of the spring 27.

Figure 4:
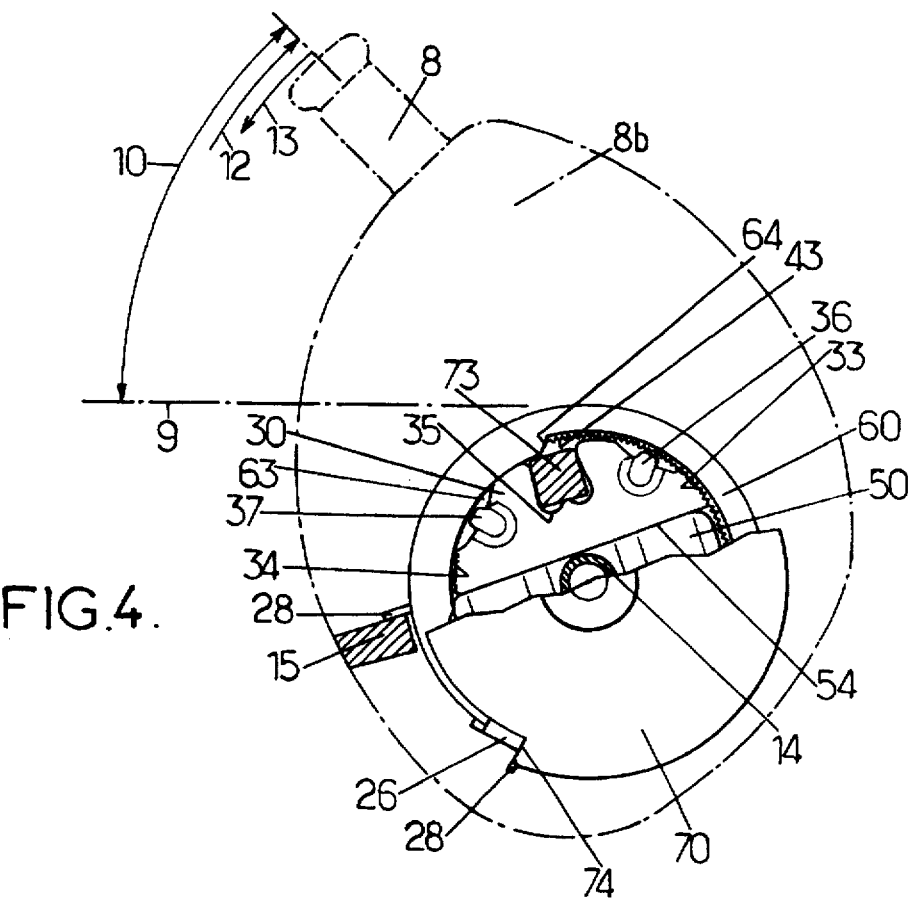
FIG. 4 is a view similar to FIG. 3, in an end-of-travel position.

The movement of the handle 8 in the first direction of rotation 12 may continue as far as the end-of-travel position represented in FIG. 4, where the limit stop 74 of the plate 70 comes into contact with the stationary tab 26.

From the position represented in FIG. 4, when the user releases the handle 8, the latter is returned to the neutral position 9 by the spring 27, it being possible for this movement also possibly being accompanied by the user if he does not let go of the handle 8.

At the beginning of the return movement towards the neutral position, the handle 8 first of all travels through a small angle during which the follower 30 is driven in sliding by the driving finger 73 against the guiding edge 54 of the leaf spring, until the first set of toothing 33 of the follower disengages from the internal toothing 43 of the ring.

The sliding of the follower 30 against the guide edge 54 is then halted by the second relief 37 of the follower coming into radial abutment against the circular slideway 63, so that the second set of toothing 34 of the follower is prevented from reaching and coming into mesh with the internal toothing 43 of the ring, as represented in FIG. 5.

In the remainder of the return movement of the handle 8 towards the neutral position, the second relief 37 of the follower slides along the slideway 63, and the follower 30 follows a pivoting movement about the axis X, this time driving the leaf spring 50 with it.

It will be noted that the return movement of the handle 8 towards the neutral position gives rise to no clicking noise, in contrast with the existing pawl-type systems.

If the first movement of the handle 8 has not raised the seat sufficiently, the user can carry out a succession of several to and fro movements similar to the movement which has just been described.

Moreover, to lower the seat part of the seat, the user first of all moves the handle 8 into the second angular sector 11 starting from the neutral position 9 in the second direction of pivoting 13, in which case it is the second set of toothing 34 of the follower which comes into mesh with the internal toothing 43 of the ring, until the limit stop 75 of the plate 70 comes into contact with the stationary tab 26.

In this case, during the return movement towards the neutral position 9 in the first direction of pivoting 12, it is the first relief 36 of the follower which slides against the slideway 63.

I claim:

1. Mechanism for controlling a rotary output member for driving said output member selectively in opposite first or second directions of rotation, said mechanism comprising:
   a handle which is mounted about an axis of pivoting and which said handle can be moved in a first direction of pivoting in a first angular sector starting from a neutral position and in a second direction of pivoting in a second angular sector starting from the neutral position,
   a ring provided with internal toothing which is centered on the axis of pivoting of the handle and which is mounted so that said ring can rotate about said axis in order to drive the output member, said ring being integral with a wall and delimiting a dish therewith,
   a guide member placed in said dish mounted so that said guide member can rotate, with friction, about the axis of pivoting of the handle,
   a toothed follower arranged with clearance inside the dish and mounted so that said follower can slide against the guide member, the follower being driven by the handle and exhibiting first and second sets of toothing which are substantially symmetric with one another with respect to a radial axis perpendicular to the direction of sliding, the follower sliding against the guide member, causing the first set of toothing of the follower to mesh with the internal toothing of the ring when the handle is moved in the first direction of pivoting in the first angular sector, and the follower sliding against the guide member causing the second set of toothing of the follower to mesh with the internal toothing of the ring when the handle is moved in the second direction of pivoting in the second angular sector, the follower further including first and second reliefs which project axially away from the wall integral with the toothed ring,
   a rigid component forming a slideway which at least partially overlaps the ring and which is arranged on the opposite side to the wall integral with the ring, said rigid component exhibiting at least one guide ramp in the shape of a circular arc, said guide ramp being centered on the axis of pivoting of the handle, and framed by first and second cutouts, the first relief of the follower facing the first cutout while the second relief faces the guide ramp when the handle is in the first angular sector, the second relief therefore interacting radially with the guide ramp to prevent the second set of toothing of the follower from meshing with the internal toothing of the ring when the handle is moved in the second angular direction, and the second relief of the follower being arranged facing the second cutout while the first relief is arranged facing the guide ramp when the handle is in the second angular sector, the first relief of the follower then interacting radially with the guide ramp to prevent the first set of toothing of the follower from meshing with the internal toothing of the ring when the handle is moved in the first angular direction.

2. Mechanism according to claim 1, in which the follower is driven by the handle by a link which has radial play with respect to the axis of pivoting and play in terms of rotation about an axis parallel to the axis of pivoting of the handle.

3. Mechanism according to claim 1, in which the guide member consists of a leaf spring which bears elastically against the wall integral with the toothed ring and, on a rigid element held a constant distance away from said wall in order thus to generate the friction which brakes the rotation of said leaf spring.

4. Mechanism according to claim 1, in which the rigid component forming a slideway is a washer exhibiting an internal edge which has been cut out to form said guide ramp and said cutouts.

5. Mechanism according to claim 2, in which the link between the handle and the follower is a driving finger which runs parallel to the axis of pivoting and which connects the handle to the follower.

6. Mechanism according to claim 5, in which the driving finger connects the follower to a rigid plate which covers the rigid component forming a slideway and which said rigid component is fixed to the handle, said rigid plate being immobilized axially with respect to the toothed ring but able to move in terms of rotation.

7. Mechanism according to claim 1, further including elastic return means for urging the handle towards the neutral position.

8. Mechanism according to claim 1, in which the handle includes a non-telescopic lever which runs as far as a free end separated from the axis of pivoting of the handle by a lever arm less than about 20 centimeters long.

9. Mechanism according to claim 1 wherein said output member is connected to an adjustment mechanism of a vehicle seat.

* * * * *